(12) United States Patent
Ashmore (10) Patent No.: US 7,380,055 B2
(45) Date of Patent: May 27, 2008

(54) APPARATUS AND METHOD IN A CACHED RAID CONTROLLER UTILIZING A SOLID STATE BACKUP DEVICE FOR IMPROVING DATA AVAILABILITY TIME

(75) Inventor: Paul Andrew Ashmore, Longmont, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 375 days.

(21) Appl. No.: 11/054,203

(22) Filed: Feb. 9, 2005

(65) Prior Publication Data

US 2005/0283648 A1 Dec. 22, 2005

Related U.S. Application Data

(60) Provisional application No. 60/581,556, filed on Jun. 21, 2004.

(51) Int. Cl.
*G06F 12/00* (2006.01)
*G06F 13/00* (2006.01)
*G06F 13/28* (2006.01)

(52) U.S. Cl. .................................. 711/112
(58) Field of Classification Search ................. 711/112
See application file for complete search history.

(56) References Cited

U.S. PATENT DOCUMENTS

| 4,874,960 A | | 10/1989 | Cybela | |
|---|---|---|---|---|
| 5,414,861 A | * | 5/1995 | Horning | ..................... 365/229 |
| 5,448,719 A | * | 9/1995 | Schultz et al. | ................. 714/5 |
| 5,596,708 A | * | 1/1997 | Weber | ........................... 714/6 |
| 6,838,923 B2 | | 1/2005 | Pearson | |

(Continued)

FOREIGN PATENT DOCUMENTS

EP 1338874 8/2003

(Continued)

OTHER PUBLICATIONS

Aerogel, http://en.wikipedia.org/wiki/Aerogel.

(Continued)

*Primary Examiner*—Matt Kim
*Assistant Examiner*—Edward J Dudek
(74) *Attorney, Agent, or Firm*—E. Alan Davis; James W. Huffman (57) ABSTRACT

An apparatus for reducing data unavailability time after a loss of main power in a storage controller is described. The controller backs up its volatile memory containing posted-write data to a non-volatile memory upon detecting a loss of main power. The controller continues to provide battery power to the volatile memory to sustain the posted-write data. If the battery is able to supply power to the volatile memory until main power is restored, the controller foregoes restoring the posted-write data to the volatile memory from the non-volatile memory. By not incurring the restore time, which may be substantial if the volatile memory is large since read rates from volatile memories are typically slow, the data unavailability time is reduced. The selective restore feature is user-disableable and also includes a brown-out timer for allowing a user to specify how long to battery-power the volatile memory if the feature is enabled.

38 Claims, 2 Drawing Sheets

U.S. PATENT DOCUMENTS

| | | |
|---|---|---|
| 6,847,192 B2 | 1/2005 | Turner et al. |
| 2002/0161970 A1 | 10/2002 | Busser |
| 2005/0132178 A1 | 6/2005 | Balasubramanian |
| 2005/0235098 A1 | 10/2005 | Tamura et al. |

FOREIGN PATENT DOCUMENTS

| | | |
|---|---|---|
| EP | 1603026 | 12/2005 |
| GB | 2362768 | 11/2001 |
| JP | 2004037258 | 2/2004 |

OTHER PUBLICATIONS

ATA-ATAPI, http://ata-atapi.com.

Hearst Electronic Products, Chosing flash memory; http://www.electronicproducts.com/print.asp?ArticleURL=toshiba.apr2004.html, Apr. 2004.

New Computers Based on Non-Volatile Random Access Memory. Http://www.techneon.com/paper/nvram.html, Jul. 2003.

Secure Digital SD PCMCIA Adapter, http://www.mittoni.com.au/secure-digital-sd-pcmcia-adapter-p-1182.html, Jun. 2002.

* cited by examiner

APPARATUS AND METHOD IN A CACHED RAID CONTROLLER UTILIZING A SOLID STATE BACKUP DEVICE FOR IMPROVING DATA AVAILABILITY TIME

CROSS REFERENCE TO RELATED APPLICATION(S)

This application claims the benefit of U.S. Provisional Application Ser. No. 60/581,556, filed Jun. 21, 2004, entitled PREEMPTIVE RECONSTRUCT FOR REDUNDANT RAID ARRAYS, having a common inventor, and which is hereby incorporated by reference for all purposes.

FIELD OF THE INVENTION

The present invention relates in general to the field of mass storage controllers, and particularly to write-caching controllers that use a non-volatile backup device to avoid loss of cached user data.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

An important characteristic of RAID controllers, particularly in certain applications such as transaction processing or real-time data capture of large data streams, is to provide fast write performance. In particular, the overall performance of the computer system may be greatly improved if the write latency of the RAID controller is relatively small. The write latency is the time the RAID controller takes to complete a write request from the computer system.

Many RAID controllers include a relatively large cache memory for caching user data from the disk drives. Caching the data enables the RAID controller to quickly return data to the computer system if the requested data is in the cache memory since the RAID controller does not have to perform the lengthy operation of reading the data from the disk drives. The cache memory may also be employed to reduce write request latency by enabling what is commonly referred to as posted-write operations. In a posted-write operation, the RAID controller reads the data specified by the computer system from the computer system into the RAID controller's cache memory and then immediately notifies the computer system that the write request is complete, even though the RAID controller has not yet written the data to the disk drives. Posted-writes are particularly useful in RAID controllers, since in some redundant RAID levels a read-modify-write operation to the disk drives must be performed in order to accomplish the system write request, i.e., not only must the specified system data be written to the disk drives, but some of the disk drives may also have to be read before the user data and redundant data can be written to the disks, which may make the write latency of a RAID controller even longer than a non-RAID controller.

However, posted-write operations make the system vulnerable to data loss in the event of a power failure. This is because the cache memory is a volatile memory that loses the user data when power is lost and the data has not yet been written to the disk drives.

To solve this problem, some RAID controllers include a battery to continue to provide power to the cache memory in the event of a loss of main power. Typically, the system automatically notifies a system administrator who attempts to restore power to the system. Although the battery greatly reduces the likelihood that user data will be lost, because the charge on the battery is finite, the possibility still exists that the battery power will run out before main power can be restored, in which case the user data will be lost. To avoid this possibility of user data loss, other RAID controllers include some form of non-volatile memory, such as a FLASH memory or small disk drive. When main power is lost, while the battery supplies power, the RAID controller copies the cache memory contents to the FLASH memory and then disables battery power. When main power is restored, the RAID controller restores the contents of the cache memory prior to the main power outage from the FLASH memory so that the posted-writes can be completed and the user data can be made available again.

However, the time required to restore the cache memory contents from the FLASH memory may be relatively lengthy, particularly, on the order of minutes. Assume, for example, a RAID controller that has 512 MB of cache memory and current FLASH memories that provide a sustained read rate of approximately 9 MB/second. In this example, the time required to restore the cache memory from FLASH memory is approximately one minute; that is, one minute more is required to boot the RAID controller after main power is restored. This is one minute more that the user data is not available to the host computer system, which in some user applications may translate to thousands of dollars of lost income. Furthermore, the additional time spent restoring the cache memory from FLASH may cause the predetermined timeout values of some server applications to be exceeded, thereby causing the application to fail. Finally, the restore time—and therefore user data unavailability time—is even greater for RAID controllers with larger cache memories than the example; and, the problem will be exacerbated even further as RAID controller cache memory sizes increase, which appears to be a definite trend.

Therefore, what is needed is an apparatus and method for reducing the data unavailability time after a loss of main power in a cached RAID controller with a non-volatile device for backing up the volatile cache memory.

BRIEF SUMMARY OF INVENTION

The present invention provides an apparatus and method for reducing the data unavailability time after a loss of main power in a cached RAID controller by continuing to supply battery power to the volatile cache memory even after the volatile memory has been backed up to the non-volatile memory, and foregoing performing a restore from the non-volatile memory to the volatile memory if it determines that the battery was able to continue supplying power to the volatile memory until the main power was restored.

In one aspect, the present invention provides a mass storage controller for providing improved data availability. The controller includes a volatile memory, for storing posted-write data, and a non-volatile memory, coupled to the volatile memory, for backing up the posted-write data from the volatile memory, in response to a loss of main power.

The controller also includes a battery, coupled to supply power to the volatile memory in response to the loss of main power, and an indicator, for indicating whether the battery continued to supply power to the volatile memory until the main power was restored. The controller also includes control logic, coupled to the indicator, configured to forego restoring the posted-write data to the volatile memory from the non-volatile memory in response to the main power being restored, if the indicator indicates the battery continued to supply power to the volatile memory until the main power was restored.

In another aspect, the present invention provides a method for improving data availability in a redundant array of disks (RAID) controller having a volatile memory for storing posted-write data, a non-volatile memory, and a battery for providing power to the controller in response to loss of main power to the controller. The method includes backing up the posted-write data from the volatile memory to the non-volatile memory, in response to the loss of main power. The method also includes determining whether the battery sustained the posted-write data in the volatile memory until the main power is restored, and restoring the posted-write data to the volatile memory from the non-volatile memory, in response to the main power being restored, only if the battery did not sustain the posted-write data in the volatile memory until the main power is restored.

In another aspect, the present invention provides an apparatus for improving data availability in a write-caching controller having a volatile memory for caching posted-write data, a non-volatile memory to which a back up of the posted-write data is performed after a main power failure, and a battery for providing power while the backup is being performed. The apparatus includes the battery attempting to continue to provide power to the volatile memory after the backup is complete and until the main power is restored. The apparatus further includes a storage element that stores an indication of whether the battery successfully continued to provide power to the volatile memory until the main power was restored. The apparatus also includes control logic, coupled to the storage element, which restores the posted-write data from the non-volatile memory to the volatile memory when the main is restored, but only if the indication indicates the battery did not continue to provide power to the volatile memory until the main power was restored.

DETAILED DESCRIPTION

Figure 1:
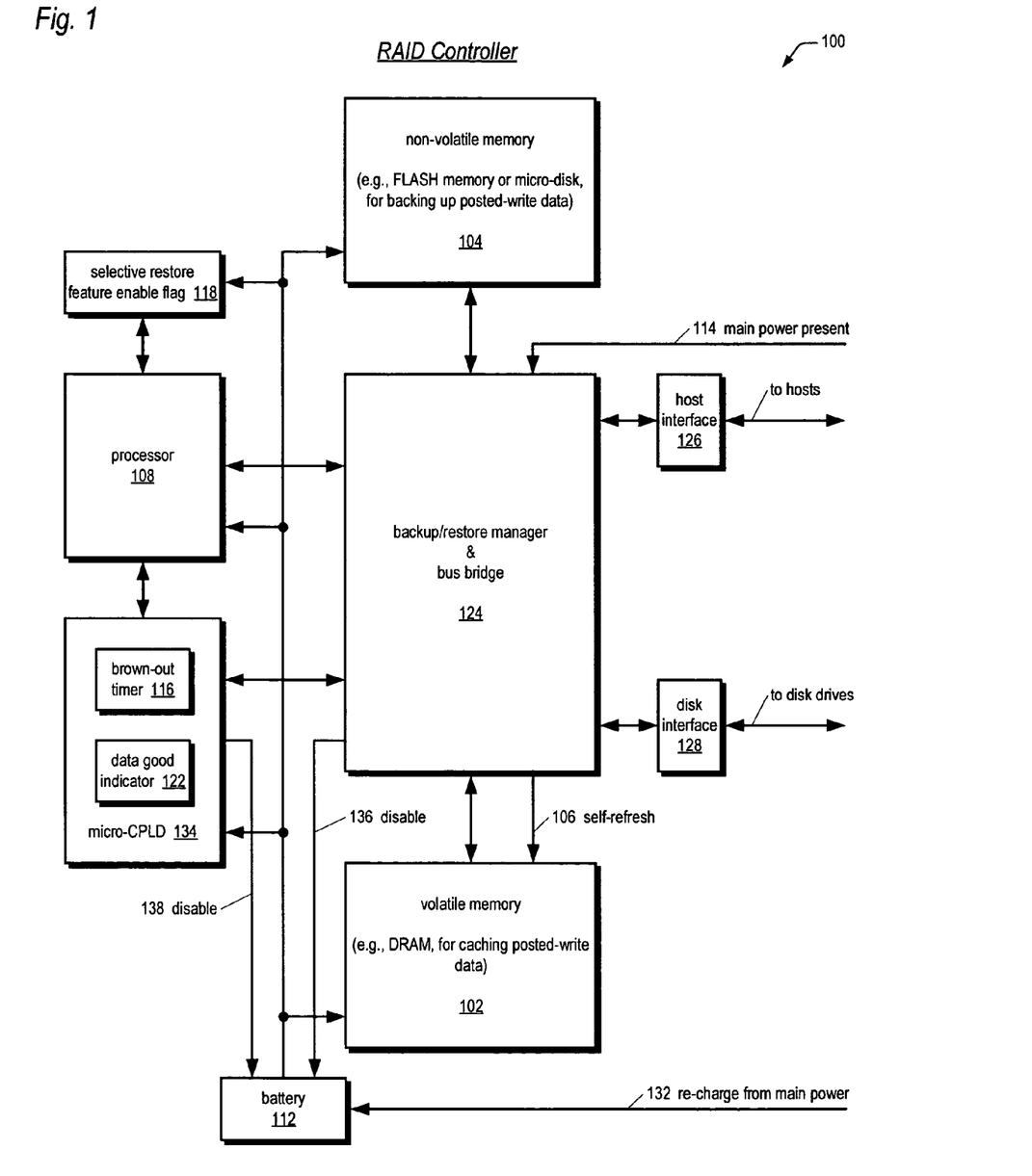
FIG. 1 is a block diagram illustrating a mass storage controller according to the present invention.

Referring now to FIG. 1, a block diagram illustrating a mass storage controller 100, such as a RAID controller, according to the present invention is shown. In one embodiment, the controller 100 may be one of a pair of active-active redundant fault-tolerant RAID controllers for providing high data availability.

The controller 100 includes a disk interface 128 for interfacing to disk drives or other mass storage devices, including but not limited to, tape drives and optical storage devices, such as CDROM or DVD drives. The disk drives store the user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, or FICON. The controller 100 reads and writes data from or to the disk drives in response to I/O requests received from host computers.

The controller 100 also includes a host interface 126 for interfacing with host computers. In one embodiment, the controller 100 is a local bus-based controller, such as a controller that plugs into, or is integrated into, a local I/O bus of the host computer system, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the controller 100 is a standalone controller in a separate enclosure from the host computers that issue I/O requests to the controller 100. For example, the controller 100 may be part of a storage area network (SAN). In this type of embodiment, the host interface 126 may comprise various interfaces such as Fibre Channel, Ethernet, Infiniband, SCSI, HIPPI, Token Ring, Arcnet, FDDI, LocalTalk, ESCON, FICON, ATM, SAS, SATA, and the like.

The controller 100 also includes a battery 112 for supplying power to the controller 100 in the event of a loss of main power, as described in more detail below. The battery is re-charged via a re-charge signal 132 from the main power supply. The battery 112 may be disabled by the backup/restore manager 124 (discussed below) via a disable signal 136 or by a micro-CPLD 134 (also discussed below) via a second disable signal 138.

The controller 100 also includes a volatile memory 102, or cache memory 102. The volatile memory 102 is volatile because it ceases to store its data when it is not powered. In one embodiment, the volatile memory 102 comprises dynamic random access memory (DRAM), which includes a self-refresh mode. When the DRAM is placed into self-refresh mode, the DRAM consumes less power than when not operating in self-refresh mode. In other embodiments, the volatile memory 102 may include other types of volatile memory, such as static random access memory (SRAM).

The volatile memory 102 is employed by the controller 100 to buffer data transferred between the hosts and disks. When a host requests data be written to the disks, the controller 100 transfers the data from the host via the host interface 126 into the volatile memory 102 and subsequently transfers the data from the volatile memory 102 via the disk interface 128 to the disks. Conversely, when a host requests data to be read from the disks, the controller 100 transfers the data from the disks via the disk interface 128 to the volatile memory 102 and subsequently transfers the data from the volatile memory 102 via the host interface 126 to the host. In particular, the volatile memory 102 is used by the controller 100 to perform write-caching of data.

As mentioned above, when a host requests data be written to the disks, the controller 100 transfers the data from the host via the host interface 126 into the volatile memory 102 and subsequently transfers the data from the volatile memory 102 via the disk interface 128 to the disks. Normally, the controller 100 does not indicate to the host that the write request is complete until the data is actually written to disk. However, if configured to do so, the controller 100 may cache the data in the volatile memory 102 and indicate to the host that the write request is complete before the data is actually written to the disk, and subsequently write, or flush, the data to disk. This operation is referred to as write-caching, or may also be referred to as a posted-write operation. The data associated with a posted-write operation is referred to as posted-write data. That is, posted-write data is data stored in the volatile memory 102 that has not yet been written to disk but concerning which the controller 100 has told the host that the write operation has completed. Additionally, the posted-write data as referred to herein may refer to control information required to write the data to disk, including but not limited to, the logical block addresses and disk drive unit numbers to which the data must be written, and information specifying whether the data is part of a RAID array with a RAID level requiring redundant data that also must be written to disk to be generated based on the posted-write data.

The volatile memory 102 may also be used by the controller 100 to perform read-caching of data, i.e., to provide requested data to the hosts from the volatile memory 102, rather than from the disks, if the data is already present in the volatile memory 102 because of a previous read request of the same data. Finally, the controller 100 may use the volatile memory 102 for buffering redundant RAID data generated for writing to the disks.

The controller 100 also includes a non-volatile memory 104. The non-volatile memory 104 is non-volatile because it continues to store its data when it is not powered. In one embodiment, the non-volatile memory 104 comprises a Compact FLASH memory. In one embodiment, the non-volatile memory 104 comprises a micro-disk drive. The non-volatile memory 104 is used by the controller 100 to backup the contents, particularly the posted-write data, of the volatile memory 102 in response to a loss of main power so that when main power returns the posted-write data may be restored from the non-volatile memory 104 to the volatile memory 102. However, as discussed above, the restore operation may be lengthy, and until the data is restored to the volatile memory 102 the user data is not available to the hosts. Advantageously, the present invention provides an apparatus and method for selectively foregoing the restore operation if it is determined that the battery was able to maintain the integrity of the posted-write data in the volatile memory 102 until main power returned, thereby making the user data available to the hosts sooner than if the restore operation were performed, as described in detail below.

The controller 100 also includes a processor 108 for executing programs to control the transfer of data between the disk drives and the hosts. The processor 108 receives commands from the hosts and responsively issues commands to the disk interface 128 to accomplish data transfers with the disk drives. The processor 108 may also perform storage controller functions such as RAID control, logical block translation, buffer management, and data caching. As discussed below in more detail, when main power is restored to the controller 100 after a loss of main power, the processor 108 selectively instructs the backup/restore manager 124 to perform or not to perform a restore of the volatile memory 102 to the non-volatile memory 104 based on whether the battery 112 was able to continue supplying power to the volatile memory 102 throughout the main power outage, referred to herein as a selective restore feature.

The controller 100 also includes a selective restore feature enable flag 118. In one embodiment, the user may provide input to enable or disable the selective restore feature. The user selection is stored in the selective restore feature enable flag 118. In one embodiment, the selective restore feature enable flag 118 is stored in a memory coupled to the processor 108 used for storing program instructions executed by the processor 108; however, other embodiments may store the selective restore feature enable flag 118 in other storage locations, such as a discrete register or in the volatile memory 102.

One advantage of the ability for the user to disable the selective restore feature is that it may reduce the likelihood of user data loss in the event of two main power losses within a period of time that is short relative to the battery 112 recharge time as follows. When a main power outage occurs, a considerable amount of the battery 112 power is typically used to perform the backup to the non-volatile memory 104. If the selective restore feature is enabled, more of the battery 112 power will be consumed by powering the volatile memory 102 with battery 112 power. Once main power is restored, the battery 112 may be recharged, but the recharge may require a relatively long length of time—perhaps on the order of hours if the battery 112 has been fully discharged. If the battery 112 has not been recharged sufficiently to perform a backup to the non-volatile memory 104 when a second main power outage occurs, user data may be lost if posted-writes are pending. Thus, by enabling the user to selectively disable the selective restore feature, the user is given the choice between potentially faster data availability time or lower risk of data loss in the event of two or more main power outages within a period of time that is short relative to the battery 112 recharge time. The brown-out timer 116, described below, gives the user even further control over this question by enabling the user to specify a length of time to consume more battery 112 power by continuing to power the volatile memory 102 after it has been backed up to the non-volatile memory 104.

The controller 100 also includes a micro-CPLD 134. The micro-CPLD 134 comprises a complex programmable logic device (CPLD) that consumes very low power. Although an embodiment is described employing a micro-CPLD, other circuits may be employed to perform the functions described herein that are performed by the micro-CPLD 134, such as custom integrated circuits or discrete components.

The micro-CPLD 134 includes a data good indicator 122. The data good indicator 122 may be read by the processor 108 and written by a backup/restore manager circuit 124 which is described below. The micro-CPLD 134 is configured such that when it is powered up, the data good indicator 122 resets to a predetermined value. In one embodiment, the data good indicator 122 power-up resets to a Boolean value of zero. Furthermore, the power-off threshold of the micro-CPLD 134 is at least as high as the power threshold at which the volatile memory 102 begins to lose its data. As described below, when main power is lost, the backup/restore manager 124 writes a value into the data good indicator 122 different from the power-up reset value. Thus, if the battery 112 fails to supply power to the volatile memory 102 (and therefore also fails to supply power to the data good indicator 122), when main power is restored, the processor 108 will read the power-up reset value from the data good indicator 122 rather than the value written by the backup/restore manager 124. Consequently, the processor 108 will determine that the volatile memory 102 must be restored from the non-volatile memory 104. However, if the processor 108 reads from the data good indicator 122 the value written by the backup/restore manager 124, then the processor 108 will determine that it can forego restoring the volatile memory 102 thereby making the user data available to the hosts sooner, as described in detail below.

The micro-CPLD 134 also includes a brown-out timer 116. The brown-out timer 116 is a timer that may be started running by the backup/restore manager 124. In one embodiment, the user may specify the expiration time of the brown-out timer 116. If the selective restore feature flag 118 is enabled, then the battery 112 will be used to continue to power the volatile memory 102 until the brown-out timer 116 expires. Thus, the brown-out timer 116 may be used to reduce the likelihood that posted-write data will be lost in the event of back-to-back main power losses, as described above with respect to the selective restore feature flag 118.

The controller 100 also includes a backup/restore manager and bus bridge circuit 124, coupled to the processor 108, micro-CPLD 134, volatile memory 102, non-volatile memory 104, host interface 126, and disk interface 128. The backup/restore manager 124 receives a main power present signal 114 that indicates whether the main power supply is supplying power to the controller 100. In one embodiment, the backup/restore manager and bus bridge circuit 124 is a custom large scale integrated circuit. The bus bridge 124 bridges the volatile memory 102 bus, the non-volatile memory 104, the processor 108 bus (which in one embodiment is a Pentium processor bus), and the host interface 126 and disk interface 128 buses (which in one embodiment are PCI-X buses). The bus bridge 124 includes a memory controller for controlling the volatile memory 102 and the non-volatile memory 104. In one embodiment, the backup/restore manager 124 includes a direct memory access controller (DMAC) used to copy the data from the volatile memory 102 to the non-volatile memory 104 during the backup operation. The operation of the backup/restore manager 124 in conjunction with the other circuit elements of the controller 100 will now be described with respect to FIG. 2.

Figure 2:
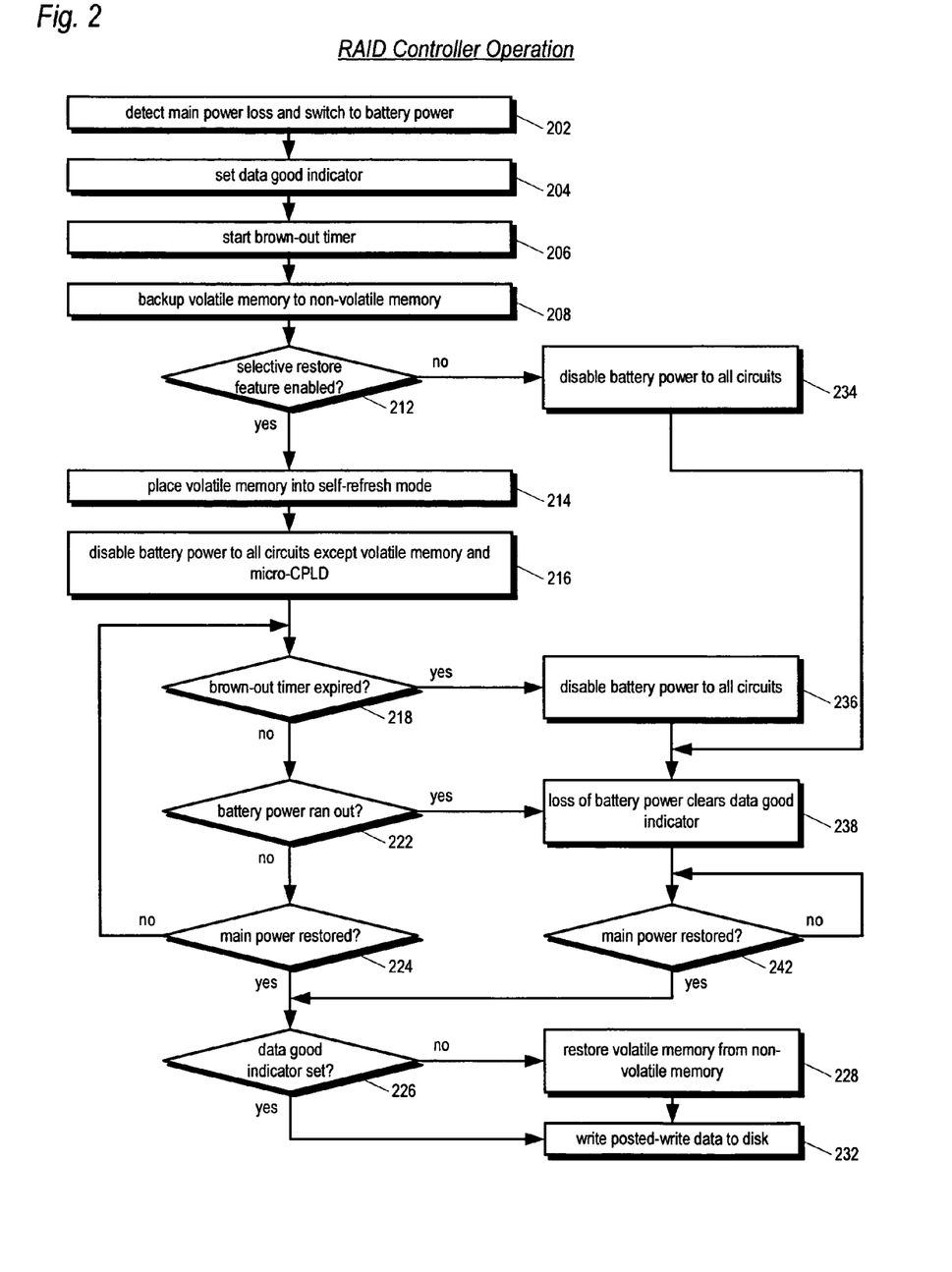
FIG. 2 is a flowchart illustrating operation of the controller of FIG. 1.

Referring now to FIG. 2, a flowchart illustrating operation of the controller 100 of FIG. 1 is shown. Flow begins at block 202.

At block 202, the backup/restore manager 124 detects a loss of main power via the main power present signal 114. In response, the backup/restore manager 124 causes the battery 112 to provide power to the other circuits of the controller 100, and in particular to the backup/restore manager 124, the volatile memory 102, the non-volatile memory 104, and the micro-CPLD 134. Flow proceeds to block 204.

At block 204, the backup/restore manager 124 sets the data good indicator 122 to a predetermined value. The predetermined value is different from the value the data good indicator 122 is cleared to in response to a power-on reset. In one embodiment, the data good indicator 122 is a single bit in a register of the micro-CPLD 134 which power-on resets to a Boolean zero value, and the predetermined value to which the backup/restore manager 124 writes the data good indicator 122 is a Boolean one value. In another embodiment, the register stores a longer data word which power-on resets to a Boolean zero value, and the predetermined value to which the backup/restore manager 124 writes the data good indicator 122 is a predetermined signature value known by the software executed by the processor 108. Flow proceeds to block 206.

At block 206, the backup/restore manager 124 starts the brown-out timer 116 running. In one embodiment, the controller 100 receives input from the user specifying the expiration time of the brown-out timer 116, prior to the loss of main power. Flow proceeds to block 208.

At block 208, the backup/restore manager 124 backs up the volatile memory 102 contents to the non-volatile memory 104. In one embodiment, the backup/restore manager 124 backs up the volatile memory 102 only if there is posted-write data in the volatile memory 102, i.e., only if the volatile memory 102 is dirty. In one embodiment, the backup/restore manager 124 copies only the posted-write data to the non-volatile memory 104. In one embodiment, the backup/restore manager 124 simply copies an image of the volatile memory 102 to the non-volatile memory 104. Flow proceeds to decision block 212.

At decision block 212, the backup/restore manager 124 determines whether the selective restore feature is enabled by examining the selective restore feature enable flag 118. In one embodiment, the controller 100 receives input from the user enabling or disabling the selective restore feature, prior to the loss of main power. If the feature is disabled, flow proceeds to block 234; otherwise, flow proceeds to block 214.

At block 214, the backup/restore manager 124 places the volatile memory 102 into self-refresh mode via signal 106 in order to reduce the drain on the battery 112. Flow proceeds to block 216.

At block 216, the backup/restore manager 124 disables battery power to all circuits except the volatile memory 102 and the micro-CPLD 134 to further reduce drain on the battery 112. Flow proceeds to decision block 218.

At decision block 218, the micro-CPLD 134 determines whether the brown-out timer 116 expired. If so, flow proceeds to block 236; otherwise, flow proceeds to decision block 222.

At decision block 222, if the battery 112 power runs out, flow proceeds to block 238; otherwise, flow proceeds to decision block 224.

At decision block 224, as long as the main power is not restored, flow returns to decision block 218; however, when the main power is restored, flow proceeds to decision block 226.

At decision block 226, the processor 108 boots up in response to the main power being restored, and determines whether the data good indicator 122 is set to the predetermined value. If so, flow proceeds to block 232, thereby foregoing the restore operation; otherwise, flow proceeds to block 228 to perform the restore operation.

In one embodiment, the processor 108 makes additional determinations at decision block 226 to decide whether to proceed to block 228 to perform the restore operation, such as whether the non-volatile memory 104 is present; whether a backup operation to the non-volatile memory 104 (such as the backup started at block 208) is in progress, and if not, whether the backup operation completed successfully; and whether the data backed up into the non-volatile memory 104 is valid. The controller 100 does not perform a restore from non-volatile memory 104 unless a non-volatile memory 104 is present, a backup was successfully completed, and the information backed up into the non-volatile memory 104 is valid. In one embodiment, the non-volatile memory 104 may be a field-replaceable unit; consequently, when main power is restored and the processor 108 reboots, if the processor 108 determines the non-volatile memory 104 is not present, no restore is performed. In one embodiment, the controller 100 maintains a flag in a separate small non-volatile memory (in one embodiment a CMOS NVRAM) indicating whether or not a backup of the volatile memory 102 to the non-volatile memory 104 was performed. One reason the controller 100 may not have performed a backup is because at the time main power was lost, the volatile memory 102 was not dirty with posted-write data. In one embodiment, the backup/restore manager 124 writes signature information into the non-volatile memory 104 after successful completion of a backup operation. When main power is restored and the processor 108 reboots, if the processor 108 determines the signature information in the non-volatile memory 104 is not good, then it is assume the posted-write data backed up to the non-volatile memory 104 is not valid, and does not perform a restore operation.

At block 228, the processor 108 instructs the backup/restore manager 124 to restore the volatile memory 102 from the non-volatile memory 104. That is, the backup/restore manager 124 copies from the non-volatile memory 104 to the volatile memory 102 the data that was backed up at block 208. At this point, the user data is now available to the host computers. In one embodiment, when the processor 108 reboots, it takes the volatile memory 102 out of self-refresh mode. Flow proceeds to block 232.

At block 232, once the processor 108 has booted up, it writes the posted-write data to disk. If block 232 was arrived at because the data good indicator 122 was set to the predetermined value, i.e., if the battery 112 maintained the integrity of the volatile memory 102 such that the restore operation at block 228 was not performed, then the user data is available as soon as the processor 108 boots up. Thus, advantageously, the controller 100 of the present invention may potentially make the user data available to the hosts sooner than in a conventional controller that does not have the selective restore feature of the present invention by an amount equal to the restore operation time. As discussed above, the restore operation time may be significant. Flow ends at block 232.

At block 234, the backup/restore manager 124 disables the battery 112 power to all circuits of the controller 100 via disable signal 136. Flow proceeds to block 238.

At block 236, the micro-CPLD 134 disables the battery 112 power to all circuits of the controller 100 via disable signal 138. Flow proceeds to block 238.

At block 238, the loss of battery power causes the data good indicator 122 to be cleared. In particular, the data good indicator 122 no longer holds the predetermined value to which it was set at block 204. Rather, when main power is restored and the micro-CPLD 134 experiences a power-on reset, the data good indicator 122 will be storing a value other than the predetermined value to which it was set at block 204, thereby indicating that the battery 112 failed to continue to supply power to the volatile memory 102, and therefore the data is no longer valid in the volatile memory 102. Flow proceeds to decision block 242.

At decision block 242, as long as the main power is not restored, flow returns to decision block 242; however, when the main power is restored, flow proceeds to decision block 226.

As may be seen from the description above, unlike conventional storage controllers, the controller 100 of the present invention requires no additional time attributed to restoring the volatile memory 102 after a main power loss if the battery 112 power survives until main power is restored since the posted-write data in the volatile memory 102 is maintained by powering the volatile memory 102 in self-refresh mode via the battery 112. Furthermore, by placing the volatile memory 102 in self-refresh mode, the battery 112 power time is increased, further increasing the likelihood that a restore from the non-volatile memory 104 will be unnecessary. Consequently, the present invention has both the advantage of extremely low likelihood of user data loss because it has a non-volatile memory 104 for backing up the posted-write data, and the advantage of fast data availability once main power is restored because it maintains battery 112 power to the volatile memory 102 during the main power outage as long as possible, and can therefore in most cases have faster boot times because no restore of the volatile memory 102 is required.

As used herein, the term control logic may be used to refer to the processor 108, the backup/restore manager 124, micro-CPLD 134, individually or any combination thereof.

Although the present invention and its objects, features, and advantages have been described in detail, other embodiments are encompassed by the invention. For example, although embodiments have been described in which the storage controller is a RAID controller, the selective restore apparatus and method described herein may also be employed in any storage controller (i.e., a non-RAID controller) that uses a cache memory to post write operations to disk drives or other storage devices. Furthermore, the invention is not limited to storage controllers; rather, the selective restore feature described herein may be employed in any controller that includes a battery and a non-volatile memory for backing up data that must be maintained through a power loss, but which requires its data to be available as soon as possible after main power is restored. Finally, although an embodiment has been described including the backup/restore manager 124, in other embodiments the processor 108 may perform the functions described herein that are performed by the backup/restore manager 124; however, the processor 108 will likely consume more battery 112 power than the backup/restore manager 124.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A mass storage controller for providing improved data availability, comprising:
    a volatile memory, for storing posted-write data;
    a non-volatile memory, coupled to said volatile memory;
    a battery, coupled to supply power to said volatile memory in response to a loss of main power;
    an indicator, for indicating whether said battery continued to supply power to said volatile memory until said main power was restored wherein said indicator comprises a storage element, coupled to receive power from said battery in response to said loss of main power, configured to provide a predetermined value when read after transitioning from a non-powered state to a powered state; and
    control logic, coupled to said indicator, configured to:
        program said storage element to a value other than said predetermined value, in response to said loss of main power;
        backup said posted-write data from said volatile memory to said non-volatile memory, in response to said loss of main power;
        determine that the main power has been restored, after the control logic backs up said posted-write data from said volatile memory to said non-volatile memory;
        determine whether said indicator indicates the battery continued to supply power to said volatile memory until said main power was restored, after said control logic determines that the main power has been restored; and
        forego restoring said posted-write data to said volatile memory from said non-volatile memory in response to said main power being restored, if said indicator indicates said battery continued to supply power to said volatile memory until said main power was restored, after said control logic determines whether said indicator indicates the battery continued to supply power to said volatile memory until said main power was restored.

2. The controller as recited in claim 1, wherein said control logic is further configured to restore said posted-write data to said volatile memory from said non-volatile memory in response to said main power being restored, if said indicator indicates said battery did not continue to supply power to said volatile memory until said main power was restored.

3. The controller as recited in claim 1, wherein said volatile memory comprises a dynamic random access memory (DRAM) including a self-refresh mode, wherein said control logic is configured to place said DRAM in said self-refresh mode after backing up said posted-write data from said volatile memory to said non-volatile memory.

4. The controller as recited in claim 1, wherein said control logic is configured to:
  write said posted-write data to a mass storage device, after restoring said posted-write data to said volatile memory from said non-volatile memory in response to said main power being restored, if said indicator indicates said battery did not continue to supply power to said volatile memory until said main power was restored; and alternatively to
  write the posted-write data to the mass storage device, after foregoing restoring said posted-write data to said volatile memory from said non-volatile memory in response to said main power being restored, if said indicator indicates said battery continued to supply power to said volatile memory until said main power was restored.

5. The controller as recited in claim 1, wherein said non-volatile memory comprises a FLASH memory.

6. The controller as recited in claim 1, wherein said non-volatile memory comprises a disk drive.

7. The controller as recited in claim 6, wherein said disk drive comprises a micro-disk drive.

8. The controller as recited in claim 1, wherein the mass storage controller comprises a redundant array of disks (RAID) controller.

9. The controller as recited in claim 1, wherein said control logic comprises a microprocessor.

10. The controller as recited in claim 1, wherein said control logic comprises a direct memory access controller (DMAC).

11. The controller as recited in claim 1, wherein said control logic comprises a memory controller.

12. The controller as recited in claim 1, wherein said control logic comprises a bus bridge.

13. The controller as recited in claim 1, wherein said control logic comprises said indicator.

14. The controller as recited in claim 1, further comprising:
  a second indicator, for indicating whether a selective restore feature of the controller is enabled;
  wherein if said second indicator indicates said selective restore feature is disabled, said control logic disables power from said battery to the controller after backing up said posted-write data from said volatile memory to said non-volatile memory.

15. The controller as recited in claim 14, wherein said selective restore feature is user-enable/disableable.

16. The controller as recited in claim 1, further comprising:
  a timer, coupled to said control logic, wherein said control logic is configured to start said timer running in response to said loss of main power;
  wherein if said timer expires, said control logic disables power from said battery to the controller.

17. The controller as recited in claim 16, wherein an expiration time of said timer is user-programmable.

18. The controller as recited in claim 1, wherein said indicator indicates said battery continued to supply power to said volatile memory until said main power was restored if said control logic reads the value other than said predetermined value from said indicator after said main power is restored.

19. The controller as recited in claim 18, wherein said storage element is comprised within a device having a power-off threshold at least as high as a power threshold at which said volatile memory begins to lose said posted-write data.

20. The controller as recited in claim 18, wherein said control logic is further configured to disable power from said battery to the controller except for to said volatile memory and to a circuit comprising said indicator, after backing up said posted-write data from said volatile memory to said non-volatile memory.

21. The controller as recited in claim 1, wherein said storage element, when powered by said battery, is configured to transition from said powered state to said non-powered state at least as soon as said volatile memory fails to store said posted-write data when said battery ceases to continue supplying power to said volatile memory during said loss of main power.

22. The controller as recited in claim 21, wherein said storage element, if said battery power fails, is configured to transition from said powered state to said non-powered state at least as soon as said volatile memory fails to store said posted-write data.

23. A method for improving data availability in a redundant array of disks (RAID) controller having a volatile memory for storing posted-write data, a non-volatile memory, a battery for providing power to the controller in response to loss of main power to the controller, and a storage element, coupled to receive power from the battery in response to the loss of main power, configured to provide a predetermined value when read after transitioning from a non-powered state to a powered state, the method comprising:
  programming the storage element to a value other than the predetermined value, in response to the loss of main power;
  backing up the posted-write data from the volatile memory to the non-volatile memory, in response to the loss of main power;
  after said backing up the posted-write data from the volatile memory to the non-volatile memory, determining that main power has been restored;
  after said determining that main power has been restored, determining whether the battery sustained the posted-write data in the volatile memory until the main power is restored by reading the storage element and determining whether the storage element provided the value other than the predetermined value; and
  after said determining whether the battery sustained the posted-write data in the volatile memory until the main power is restored, restoring the posted-write data to the volatile memory from the non-volatile memory, in response to the main power being restored, if the battery did not sustain the posted-write data in the volatile memory until the main power is restored, and foregoing said restoring the posted-write data if the battery did sustain the posted-write data.

24. The method as recited in claim 23, further comprising:
placing the volatile memory in self-refresh mode, after said backing up the posted-write data.

25. The method as recited in claim 24, further comprising:
taking the volatile memory out of self-refresh mode, after the main power is restored.

26. The method as recited in claim 23, further comprising:
writing the posted-write data to a mass storage device, after said restoring the posted-write data to the volatile memory from the non-volatile memory, if the battery did not sustain the posted-write data in the volatile memory until the main power was restored; and alternatively
writing the posted-write data to the mass storage device, after said determining whether the battery sustained the posted-write data in the volatile memory until the main power is restored, if the battery sustained the posted-write data in the volatile memory until the main power was restored.

27. The method as recited in claim 23, further comprising:
determining whether a selective restore feature of the controller is enabled; and
removing the battery power to the controller, if the selective restore feature of the controller is disabled.

28. The method as recited in claim 27, further comprising:
receiving user input specifying whether the selective restore feature of the controller is enabled, prior to said determining whether the selective restore feature of the controller is enabled.

29. The method as recited in claim 23, further comprising:
staffing a timer, in response to the loss of main power;
determining whether the timer has reached a time; and
removing the battery power to the controller, if the timer has reached the time.

30. The method as recited in claim 29, further comprising:
receiving user input specifying the time, prior to the loss of main power.

31. The method as recited in claim 23, wherein the storage element is comprised within a device having a power-off threshold at least as high as a power threshold at which the volatile memory begins to lose the posted-write data.

32. The method as recited in claim 23, further comprising:
disabling the battery power to the controller except for the volatile memory and a circuit comprising the storage element, after said backing up the posted-write data from the volatile memory to the non-volatile memory.

33. An apparatus for improving data availability in a write-caching controller having a volatile memory for caching posted-write data, a non-volatile memory to which a back up of the posted-write data is performed after a main power failure, and a battery for providing power while the backup is being performed, the apparatus comprising:
wherein the battery attempts to continue to provide power to the volatile memory after the backup is complete and until the main power is restored;
a storage element, for storing an indication of whether the battery successfully continued to provide power to the volatile memory until the main power was restored, coupled to receive power from the battery in response to the main power failure, configured to provide a predetermined value when read after transitioning from a non-powered state to a powered state; and
control logic, coupled to said storage element, configured to:
program said storage element to a value other than said predetermined value in response to the main power failure;
backup the posted-write data from the volatile memory to the non-volatile memory, in response to the main power failure;
determine that the main power has been restored, after the control logic backs up said posted-write data from the volatile memory to the non-volatile memory;
determine whether the storage element indicates the battery successfully continued to provide power to the volatile memory until the main power was restored; and
restore the posted-write data from the non-volatile memory to the volatile memory when the main power is restored, only if said indication indicates the battery did not continue to provide power to the volatile memory until the main power was restored, after the control logic determines whether the storage element indicates the battery successfully continued to provide power to the volatile memory until the main power was restored.

34. The apparatus as recited in claim 33, wherein said non-volatile memory comprises a FLASH memory.

35. The apparatus as recited in claim 33, wherein the write-caching controller comprises a RAID controller.

36. The apparatus as recited in claim 33, further comprising:
a user-programmable timer, coupled to said control logic, wherein said control logic staffs said timer when the main power fails, wherein if said timer expires, said control logic disables the batter power.

37. The apparatus as recited in claim 33, further comprising:
a user-programmable flag, coupled to said control logic, for selectively disabling a selective restore feature, wherein if said flag indicates said feature is disabled, said control logic disables the batter power when the backup is complete rather than attempting to continue to provide power to the volatile memory until the main power is restored.

38. The apparatus as recited in claim 33, wherein said storage element is comprised within a device having a power-off threshold at least as high as a power threshold at which the volatile memory begins to lose the posted-write data.

* * * * *